United States Patent [19]

Bergmann et al.

[11] Patent Number: 4,537,597
[45] Date of Patent: Aug. 27, 1985

[54] NAVY BLUE MIXTURES OF DISPERSE MONO-AZO DYES FOR CELLULOSE ACETATE

[75] Inventors: Udo Bergmann, Darmstadt; Helmut Degen, Frankenthal; Guenter Hansen, Ludwigshafen; Reinhold Krallmann, Weisenheim; Hans Weber, Hassloch, all of Fed. Rep. of Germany

[73] Assignee: Basf Aktiengesellschaft, Ludwigshafen, Fed. Rep. of Germany

[21] Appl. No.: 611,536

[22] Filed: May 17, 1984

[30] Foreign Application Priority Data

May 20, 1983 [DE] Fed. Rep. of Germany ....... 3318451

[51] Int. Cl.³ ............... C09B 29/08; C09B 67/22; D06P 1/04
[52] U.S. Cl. .......................... 8/639; 8/921; 534/799; 534/843
[58] Field of Search .................. 8/639

[56] References Cited

U.S. PATENT DOCUMENTS

| 3,621,009 | 11/1971 | Ono et al. | 8/639 |
| 3,955,919 | 5/1976 | Fujii et al. | 8/639 |
| 4,181,653 | 1/1980 | Clark | 260/207 |
| 4,321,055 | 3/1982 | Hansen et al. | 8/639 |
| 4,386,934 | 6/1983 | Bergmann et al. | 8/639 |
| 4,389,216 | 6/1983 | Bergmann et al. | 8/639 |
| 4,401,692 | 8/1983 | Schickfluss et al. | 8/471 |
| 4,405,330 | 9/1983 | Bergmann et al. | 8/639 |
| 4,447,359 | 5/1984 | Aeschlimann | 260/207 |

FOREIGN PATENT DOCUMENTS 57-139579 8/1982 Japan .

Primary Examiner—A. Lionel Clingman
Attorney, Agent, or Firm—Oblon, Fisher, Spivak, McClelland & Maier

[57] ABSTRACT

Mixtures of dyes of the formula I

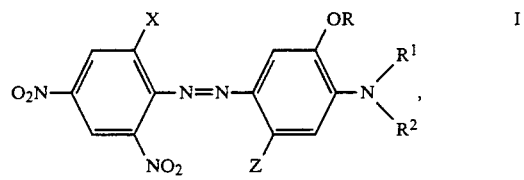

where X is chlorine or bromine, Z is hydrogen, methyl, ethyl, $C_1$–$C_4$-alkoxy or acetylamino, R is $C_1$–$C_4$-alkyl, $R^1$ and $R^2$ independently of one another are each allyl or methallyl or are each $C_1$–$C_6$-alkyl which is unsubstituted or substituted by hydroxyl, $C_1$–$C_4$-alkoxy or alkanoyloxy, or $R^1$ and $R^2$ together with the nitrogen atom are morpholino or tetra-, penta- or hexamethyleneimino, and one of the radicals $R^1$ and $R^2$ may furthermore be hydrogen.

5 Claims, No Drawings

NAVY BLUE MIXTURES OF DISPERSE MONO-AZO DYES FOR CELLULOSE ACETATE

The present invention relates to mixtures of dyes of the formula

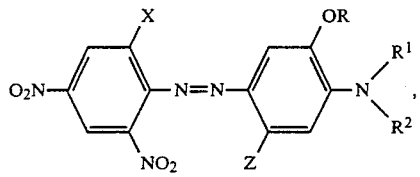

where X is chlorine or bromine, Z is hydrogen, methyl, ethyl, $C_1$–$C_4$-alkoxy or acetylamino, R is $C_1$–$C_4$-alkyl, $R^1$ and $R^2$ independently of one another are each allyl or methallyl or are each $C_1$–$C_6$-alkyl which is unsubstituted or substituted by hydroxyl, $C_1$–$C_4$-alkoxy or alkanoyloxy, or $R^1$ and $R^2$ together with the nitrogen atom are morpholino or tetra-, penta- or hexamethyleneimino, and one of the radicals $R^1$ and $R^2$ may furthermore be hydrogen.

Alkyl radicals $R^1$ and $R^2$ are, for example, pentyl or hexyl, in particular propyl or butyl, and preferably methyl or ethyl, including n- and i-radicals. Further examples include hydroxyethyl, hydroxypropyl, acetoxyethyl, acetoxypropyl, propionyloxyethyl, propionyloxypropyl, methoxyethyl, ethoxyethyl, propoxyethyl and butoxyethyl.

Compounds which are particularly useful industrially as a component of the mixture are those of the formula

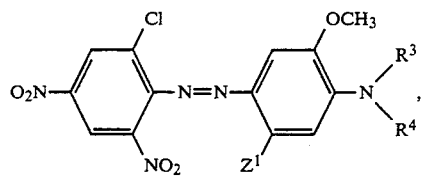

where $R^3$ and $R^4$ are each methyl, ethyl, hydroxyethyl, hydroxypropyl, acetoxyethyl, acetoxypropyl or allyl and $R^4$ may furthermore by hydrogen, and $Z^1$ is methyl, methoxy, ethoxy or acetylamino.

The mixtures preferably contain 2 or 3 different dyes, mixtures of two components containing the dyes in a ratio of, in particular, from 30:70 to 70:30, and those of three components containing not less than 10% of each dye and not more than 80% of any dye.

Preferred three-component mixtures are those in which none of the components are present in an amount of less than 20%.

The mixtures according to the invention can furthermore contain minor amounts of other dyes which are formed during the synthesis as a result of the presence of impurities in the coupling components.

The novel mixtures are useful for dyeing cellulose acetates, such as 2½-acetate and triacetate. Suitable dyeing methods are the dyeing and printing processes conventionally used for disperse dyes, and these processes are illustrated in the Examples.

The novel mixtures give intense navy dyeings with excellent wetfastness properties and good fastness to crocking and to nitric oxide, but limited lightfastness. However, since cellulose acetates are essentially used as linings, lower lightfastness is acceptable.

Japanese Patent Publication No. 77/136275 discloses the use of some compounds of the formula I as transfer dyes for polyesters. Surprisingly, the mixtures according to the invention give satisfactory dyeings and prints on cellulose esters, whereas individual dyes and the transfer printing method give unsatisfactory results.

In the Examples which follow, parts and percentages are by weight, unless stated otherwise.

EXAMPLE 1

21.7 parts of 2-chloro-4,6-dinitroaniline were dissolved in 100 parts of 96% strength sulfuric acid, after which diazotization was carried out at 5°–10° C. with 32 parts of nitrosylsulfuric acid (11.5% of $N_2O_3$) and the mixture was stirred for 16 hours at 10°–15° C. A mixture of 14.5 parts of 2,5-dimethoxy-N,N-diethylaniline, 5.9 parts of 2,5-dimethoxy-N-ethylaniline and 1 part of amidosulfonic acid was dissolved in a mixture of 300 parts of water and 18.4 parts of 96% strength sulfuric acid, and 1,000 pats of ice were added. The diazonium salt solution was then run in at 0°–5° C. in the course of one hour, and a total of 250 parts of anhydrous sodium acetate was introduced in the course of the feed. When coupling was complete, the dye suspension was heated to 60° C., and the dye was filtered off, washed neutral with water and dried. 32 parts of a dye mixture were obtained, the mixture consisting of 22.4 parts of the dye in which X is chlorine and $R^1$ and $R^2$ are each $C_2H_5$ and 9.6 parts of the dye in which X is chlorine, $R^1$ is H and $R^2$ is $C_2H_5$.

EXAMPLE 2

23.3 parts of 2,5-dimethoxy-N,N-diallylaniline in a mixture of 300 parts of water, 18.4 parts of sulfuric acid and 1,000 parts of ice were reacted, by a procedure similar to that described in Example 1, with a diazonium salt solution obtained from 21.7 parts of 2-chloro-4,6-dinitroaniline, 250 parts of anhydrous sodium acetate being added. Filtration, washing and drying gave 39 parts of a dye in which X is chlorine, R is $CH_3$, Z is $OCH_3$ and $R^1$ and $R^2$ are each $CH_2$—$CH$=$CH_2$, which were milled in a ball mill with 39 parts of a dye mixture obtained as described in Example 1 to give 78 parts of a novel dye mixture consisting of 39 parts of a dye in which X is chlorine, R is $CH_3$, Z is $OCH_3$ and $R^1$ and $R^2$ are each $CH_2$—$CH$=$CH_2$, 27.3 parts of a dye in which X is chlorine, R is $CH_3$, Z is $OCH_3$ and $R^1$ and $R^2$ are each $C_2H_5$ and 11.7 parts of a dye in which X is chlorine, R is $CH_3$, Z is $OCH_3$, $R^1$ is H and $R^2$ is $C_2H_5$.

EXAMPLE 3 a. 23 parts of N,N-bishydroxyethyl-2-methoxy-5-methylaniline in a mixture of 250 parts of water, 50 parts by volume of concentrated hydrochloric acid, 100 parts of dimethylformamide and 1,000 parts of ice were reacted with a diazonium salt solution prepared from 21.7 parts of 2-chloro-4,6-dinitroaniline by a method similar to that described in Example 1. When coupling was complete, the dye was filtered off, washed and dried. 42 parts of a dye in which X is chlorine, R and Z are each $CH_3$ and $R^1$ and $R^2$ are each $C_2H_4OH$ were obtained.

b. 32 parts of N,N-bisacetoxyethyl-2-methoxy-5-methylaniline were reacted, by a method similar to that described in Example 3a, with a diazonium salt solution prepared from 21.7 parts of 2-chloro-4,6-dinitroaniline.

52 parts of a dye in which X is chlorine, R and Z are each CH$_3$ and R$^1$ and R$^2$ are each $$C_2H_4OCCH_3$$
$$\|$$
$$O$$

were obtained.

c. 50 parts of the dye obtained as described in Example 3a were milled in a ball mill with 50 parts of the dye from Example 3b. On 2½ acetate, the resulting dye mixture gave intense navy dyeings with, in particular, outstanding fastness to perspiration.

EXAMPLE 4

21.7 parts of 2-chloro-4,6-dinitroaniline were diazotized by a method similar to that described in Example 1, and the mixture was introduced, in the course of 1 hour, into a mixture of 14.5 parts of N,N-bishydroxyethyl-2-methoxy-5-acetylaminoaniline and 16.3 parts of N,N-bisacetoxyethyl-2-methoxy-5-acetylaminoaniline in 250 parts of water, 50 parts by volume of concentrated hydrochloric acid, 100 parts of dimethylformamide and 1,000 parts of ice. When coupling was complete, the dye was filtered off under suction, washed neutral and dried. 50 parts of a dye mixture were obtained, the mixture consisting of 25 parts of a dye in which X is chlorine, R is CH$_3$, Z is NHCOCH$_3$ and R$^1$ and R$^2$ are each C$_2$H$_4$OH and 25 parts of a dye of the formula I, where X is chlorine, R is CH$_3$, Z is NHCOCH$_3$ and R$^1$ and R$^2$ are each $$C_2H_4OCCH_3.$$
$$\|$$
$$O$$

| Example No. | Parts | X | R | Z | R$^1$ | R$^2$ |
|---|---|---|---|---|---|---|
| 5 | 50 | Cl | CH$_3$ | OCH$_3$ | CH$_2$CH=CH$_2$ | CH$_2$CH=CH$_2$ |
|  | 40 | Cl | CH$_3$ | OCH$_3$ | H | C$_2$H$_5$ |
|  | 10 | Cl | CH$_3$ | OCH$_3$ | C$_2$H$_5$ | C$_2$H$_5$ |
| 6 | 25 | Cl | CH$_3$ | OCH$_3$ | CH$_3$ | CH$_3$ |
|  | 45 | Cl | CH$_3$ | OCH$_3$ | C$_2$H$_5$ | C$_2$H$_5$ |
|  | 30 | Cl | CH$_3$ | OCH$_3$ | H | C$_2$H$_5$ |
| 7 | 20 | Br | C$_2$H$_5$ | OC$_2$H$_5$ | CH$_3$ | CH$_3$ |
|  | 10 | Br | C$_2$H$_5$ | OC$_2$H$_5$ | H | CH$_3$ |
|  | 70 | Cl | CH$_3$ | OCH$_3$ | n-C$_3$H$_7$ | n-C$_3$H$_7$ |
| 8 | 30 | Cl | C$_2$H$_5$ | OC$_2$H$_5$ | H | CH$_3$ |
|  | 70 | Cl | C$_2$H$_5$ | OC$_2$H$_5$ | CH$_3$ | CH$_3$ |
| 9 | 40 | Cl | CH$_3$ | OCH$_3$ | H | CH$_3$ |
|  | 60 | Cl | CH$_3$ | OCH$_3$ | CH$_3$ | CH$_3$ |
| 10 | 30 | Cl | CH$_3$ | OCH$_3$ | CH$_2$CH=CH$_2$ | CH$_2$CH=CH$_2$ |
|  | 30 | Br | CH$_3$ | OCH$_3$ | H | C$_2$H$_5$ |
|  | 40 | Br | CH$_3$ | OCH$_3$ | C$_2$H$_5$ | C$_2$H$_5$ |
| 11 | 60 | Cl | CH$_3$ | OCH$_3$ | cyclopentyl | |
|  | 20 | Cl | CH$_3$ | OCH$_3$ | C$_2$H$_5$ | C$_2$H$_5$ |
|  | 20 | Cl | CH$_3$ | OCH$_3$ | H | C$_2$H$_5$ |
| 12 | 50 | Br | CH$_3$ | CH$_3$ | C$_2$H$_4$OCCH$_3$ (O) | C$_2$H$_4$OCCH$_3$ (O) |
|  | 50 | Br | CH$_3$ | OCH$_3$ | C$_2$H$_4$OH | C$_2$H$_4$OH |
| 13 | 50 | Cl | CH$_3$ | OCH$_3$ | C$_2$H$_4$OH | C$_2$H$_4$OH |
|  | 50 | Br | CH$_3$ | OCH$_3$ | C$_2$H$_4$OH | C$_2$H$_4$OH |
| 14 | 50 | Cl | CH$_3$ | OCH$_3$ | C$_2$H$_5$ | C$_2$H$_5$ |

-continued

| Example No. | Parts | X | R | Z | R$^1$ | R$^2$ |
|---|---|---|---|---|---|---|
|  | 50 | Cl | CH$_3$ | OCH$_3$ | C$_2$H$_4$OH | C$_2$H$_4$OH |
| 15 | 60 | Cl | CH$_3$ | CH$_3$ | C$_2$H$_4$OH | C$_2$H$_4$OH |
|  | 40 | Cl | CH$_3$ | OCH$_3$ | C$_2$H$_4$OH | C$_2$H$_4$OH |
| 16 | 70 | Cl | CH$_3$ | OCH$_3$ | C$_2$H$_5$ | C$_2$H$_5$ |
|  | 10 | Cl | CH$_3$ | OCH$_3$ | H | C$_2$H$_5$ |
|  | 20 | Cl | CH$_3$ | CH$_3$ | C$_2$H$_4$OH | C$_2$H$_4$OH |
| 17 | 30 | Cl | CH$_3$ | NHCOCH$_3$ | C$_2$H$_4$OCCH$_3$ (O) | C$_2$H$_4$OCCH$_3$ (O) |
|  | 70 | Cl | CH$_3$ | NHCOCH$_3$ | C$_2$H$_4$OH | C$_2$H$_4$OH |

EXAMPLES OF DYEING ON 2½-ACETATE a. 100 parts of a cellulose 2½ acetate yarn are dyed in the course of 60 minutes at 85° C. in a bath which contains 2,000 parts of water, 1.5 parts of a finely divided dye mixture from Example 1 and 3 parts of the reaction product obtained from 1 mole of castor oil and 40 moles of ethylene oxide.

The resulting deep navy dyeing has good fastness to crocking and to nitric oxide and excellent wetfastness properties.

b. 100 parts of a cellulose 2½-acetate fabric are dyed in the course of 60 minutes at 85° C. in a bath which contains 2,000 parts of water, 1 part of a finely divided dye obtained as described in Example 3a and 3 parts of the reaction product obtained from 1 mole of castor oil and 40 moles of ethylene oxide. The resulting navy dyeing has good fastness to crocking and to nitric oxide and very good wetfastness properties.

c. 100 parts of a cellulose 2½-acetate yarn are dyed in the course of 60 minutes at 85° C. in a bath which contains 2,000 parts of water, 1 part of the dye mixture from Example 3c and 3 parts of the reaction product obtained from 1 mole of castor oil and 40 moles of ethylene oxide. The navy dyeing has good fastness to crocking and to nitric oxide and very good wetfastness properties.

d. 100 parts of a cellulose 2½-acetate fabric are dyed in the course of 60 minutes at 85° C. in a bath which contains 2,000 parts of water, 1.3 parts of a finely divided dye mixture from Example 17 and 3 parts of the reaction product obtained from 1 mole of castor oil and 40 moles of ethylene oxide. The navy dyeing has very good wetfastness properties as well as good fastness to crocking and to nitric oxide.

EXAMPLES OF DYEING ON TRIACETATE 100 parts of a triacetate fabric are treated in a dye liquor which contains 1,000 parts of water, 1.0 part of a finely divided dye mixture from Example 5 and 0.75 part of the product obtained from the addition reaction of 50 moles of ethylene oxide with 1 mole of sperm oil alcohol followed by sulfonation. The pH is brought to 5.0 with 30% strength acetic acid, after which dyeing is begun at 50°–60° C., the temperature is increased to 120° C. in the course of 30 minutes and dyeing is continued for a further 60 minutes at this temperature. The resulting dark blue dyeing has excellent wetfastness properties, in particular very good fastness to perspiration and to washing.

EXAMPLE OF PRINTING ONTO 2½-ACETATE

A 2½-acetate fabric is printed with a paste which contains 100 parts of a finely divided dye mixture obtained as described in Example 6, 290 parts of water, 600 parts of a thickener based on locust bean ether and 10 parts of triisobutyl phosphate. After drying, the printed fabric is steamed with saturated steam at 102° C. for 30 minutes.

The resulting navy print has very good wetfastness properties and good fastness to crocking and to nitric oxide.

We claim:

1. A dye mixture which contains at least two different dyes of the formula

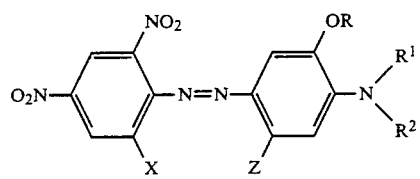

wherein
X is chlorine or bromine,
Z is methyl, methoxy, ethoxy or acetylamino,
R is methyl or ethyl and
$R^1$ and $R^2$ independently of one another are hydroxyethyl, hydroxypropyl, acetoxyethyl, acetoxypropyl, propionyloxyethyl or propionyloxypropyl.

2. The dye mixture of claim 1 which contains a dye of the formula

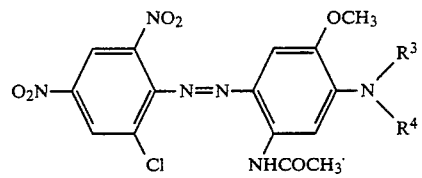

wherein

is $-N(C_2H_4OH)_2$ or $-N(C_2H_4OCOCH_3)_2$.

3. The dye mixture of claim 1 which consists of two dyes, wherein the minimum quantity of either dye based on the total weight of the mixture is 30%.

4. The dye mixture of claim 2 which consists of three dyes wherein the minimum quantity of any one dye based on the total weight of the mixture is 10%.

5. The dye mixture of claim 4 wherein the minimum quantity of any one dye based on the total weight of the mixture is 20%.

* * * * *